United States Patent [19]
Hawkins

[11] Patent Number: 6,120,604
[45] Date of Patent: Sep. 19, 2000

[54] POWDER COATING PAINTING APPARATUS WITH UNIVERSAL MODULAR LINE CONTROL

[75] Inventor: Brian Thomas Hawkins, Martinsville, N.J.

[73] Assignee: George Koch Sons, Inc., Evansville, Ind.

[21] Appl. No.: 08/906,522

[22] Filed: Aug. 5, 1997

[51] Int. Cl.[7] ........................................................ B05C 5/00
[52] U.S. Cl. .......................... 118/676; 118/679; 118/682; 118/696; 118/697; 118/704; 118/712; 118/300; 118/308; 198/502.3; 198/341; 198/358; 198/349.6
[58] Field of Search .................................... 118/676, 679, 118/682, 697, 696, 704, 308, 300, 712; 193/502.3, 339.1, 339.2, 341, 358, 349.6

[56] References Cited

U.S. PATENT DOCUMENTS

| | | |
|---|---|---|
| 4,075,011 | 2/1978 | Iwasa et al. . |
| 4,601,743 | 7/1986 | Canfield . |
| 4,717,013 | 1/1988 | Reissmann et al. . |
| 4,957,532 | 9/1990 | Jacobsen et al. . |
| 5,000,985 | 3/1991 | Salisbury . |
| 5,186,308 | 2/1993 | Munro . |
| 5,264,037 | 11/1993 | Salisbury . |
| 5,318,167 | 6/1994 | Bronson et al. . |
| 5,443,642 | 8/1995 | Bienduga ................................ 118/688 |

FOREIGN PATENT DOCUMENTS

| | | |
|---|---|---|
| 58-139910 | 8/1983 | Japan . |
| 61-257814 | 11/1986 | Japan . |
| 2-75514 | 3/1990 | Japan . |

OTHER PUBLICATIONS

Peter Gribble, Products Finishing–"Coat it Now, Form it Later"; Products Finishing Magazine, Feb., 1994.

Nordson Corp., European Div., Stockport, England, Thermal Innovations Corp., Manasquan, N.J., & TRIAB/Tri Innovations, Molndal Sweden, "Jolly good test results show British appliance maker the benefits of blank coating"; *Powder Coating*, Jun. 1991.

Curtis Leach, "The Preparation, Powder Coating and Curing of Pre–Cut Metal Sheets for Postforming"; Powder Coating Conference Proceedings, Cincinnati, Ohio, Oct. 11–13, 1994 pp. 57–67.

*Primary Examiner*—Laura Edwards

[57] ABSTRACT

A conveyor system for transporting parts through a plurality of processing areas. The conveyor system comprises a plurality of conveyors, each of the conveyors for transporting parts through an associated one of the processing areas. Each of the conveyors are driven by a motor. Each of a plurality of sensors are associated with one of the plurality of processing areas. Each of a plurality of control interfaces are associated with a device in one of the plurality of processing areas. Each of a plurality of control circuits are associated with one of the plurality of processing areas and coupled to corresponding sensors and corresponding interfaces. At least one operator interface is coupled to the plurality of control circuits. Wherein, the operator interface can modularly control and monitor devices within the plurality of processing areas.

20 Claims, 4 Drawing Sheets

POWDER COATING PAINTING APPARATUS WITH UNIVERSAL MODULAR LINE CONTROL

CROSS REFERENCES TO RELATED APPLICATION

This application is related to co-pending U.S. patent application Ser. No. 08/880,733, filed on Jun. 23, 1997, entitled POWDER COATING PAINTING APPARATUS WITH CONVEYOR SYNCHRONIZATION AND ANTI-JAMMING MEANS.

FIELD OF THE INVENTION

The present invention relates to mass production painting apparatus and more specifically, to a continuously running, conveyorized powder coating apparatus having modular line control features.

BACKGROUND OF THE INVENTION

In the early 1970's, the consumer products industry began substituting powder coatings for liquid and porcelain coatings on sheet metal based enclosures used in consumer products. For example, powder coatings are used on washer tops and lids, dryer interiors, microwave cavities, air conditioner wrappers, and office furniture. This was done to achieve better performance, increase coating application efficiency and to comply with new state VOC regulations.

Mass production of such consumer products has been previously accomplished by painting (both liquid and powder coating) the metal enclosures and the like, after the sheet metal used for the enclosure has been cut and formed into final, desired shape. This type of product finishing process is known as pre-forming.

Over approximately the last decade in the appliance industry, finishing methods have been changing. This change has been driven by the need to improve quality and reduce finishing costs. In particular, the appliance industry has successfully implemented a method commonly referred to as the "coil process." The coil process utilizes steel coils that have been pre-painted using liquid or powder coatings, prior to cutting and forming. The coil process has provided appliance manufacturers with substantial finishing cost reductions. The coil process requires that the manufacturer purchase the steel coil with the coating already applied by means of high speed, high cost, coil coating equipment.

While appliance manufacturer's have enjoyed the reduced cost benefits of this precoating/coil process, there are some major disadvantages that are associated with it. These disadvantages include the inability to control coating quality; bare, unpainted edges that reduce overall final product quality due to premature edge corrosion; and coated metal scrap which has a negative environmental impact. Other disadvantages stem from the complex nature of the high-production coil coating equipment, which requires a large capital investment on the order of 80–100 million dollars. Such large capital expenditures stifle supplier competition and inhibit further cost reduction. Furthermore, the high speed coating lines (350 feet per minute plus) associated with the coil process, require the use of solvent based coatings which negatively impact the environment and increase raw material costs.

These and other disadvantages have prevented the coil process from becoming the primary finishing method in the appliance industry and the like. In particular, only about 5–7% of all appliance enclosures are produced using the coil process.

The appliance industry has attempted to overcome these disadvantages, by utilizing pre-cut blanks of sheet metal which are then processed and powder coated using a high speed conveyorized transport system on the manufacturing site prior to forming into the final enclosure shape. This process is commonly referred to in the industry as the "blank powder coat finishing process."

In the blank powder coat finishing process, metal is blanked or precut into individual substrates which each have all their requisite pierces, notches and the like formed in them. This provides the advantage of having all the desired metal cutting performed prior to painting. Thus, all cut edges are powder coated thereby eliminating the presence of bare edges, which are a major source of corrosion. By comparison, the coil process cuts the metal after it is painted, which exposes bare edges, as well as generates scrap that is costly to the manufacturer and detrimental to the environment.

After blanking, each substrate is cleaned and pretreated with a chemical conversion coating; and then powder coated. The application of powder to the flat substrate (pre-coating) provides many advantages over post-coating of formed parts. For instance, the transfer efficiency can be high enough that reclaim overspray powder may not be necessary, especially with present state of the art application equipment. This reduces capital equipment costs and facilitates color changes. Further, pre-coating substantially flat blanks allows for greater film thickness control when compared to postcoating of formed parts since, the geometric complexity of the formed part makes its difficult to maintain the thickness of the paint film.

Once powder coated, the blanks are rapidly cured using infrared (IR) heating for part or all of the curing cycle. Rapid curing schedules enable the advantages of the blank process to be fully realized since, rapid curing allows substantial reductions in floor space. The IR heating allows very rapid upheat to the requisite powder curing temperatures. Accordingly, bake schedules of less than 60 seconds are possible which allows for typical IR oven lengths of as short as 50 feet. Additionally, since powder coatings are solvent free, they are well suited for short curing schedules where fast upheat rates are required, and produce exceptionally smooth films. With such rapid paint curing times, "blanking" line speeds are very high and can range from 50 to 80 feet per minute.

The fully cured painted blanks can be stacked for future use or immediately formed in existing forming equipment. In many cases, forming involves very sharp bends and/or metal drawing. Compared with liquid coatings, powder coatings have an exceptional balance of hardness and flexibility.

One can see that the blank powder coat finishing process substantially addresses all of the disadvantages of the coil process while providing similar or better cost reduction on a per part basis compared to the coil process. This is because blank powder coating systems require a capital investment on the order of only 3–10 million dollars, which is directly proportional to production tonnage requirements.

As mentioned earlier, the blanking line speeds in a typical blank powder coat finishing process can approach between 50 and 80 feet per minute. Such high line speeds require careful control and accurate setup for the chemical pretreatment, powder coating application, and curing. A mechanical problem or out of specification process will effect a large number of blanks in a short period of time because of the high line speed. Rapid access to all machine control functions for operation and maintenance is essential in order to properly operate as such high line speeds. Operators must continuously monitor the system for proper operation. System diagnostics and maintenance require the dispatching of skilled personnel to the location.

Accordingly, a need exists for rapid simple access to machine control functions by operators and maintenance personnel for the high speed conveyorized transport systems used in blank powder coat finishing processes.

SUMMARY OF THE INVENTION

In accordance with the present invention, a conveyor system for transporting parts through a plurality of processing areas. The conveyor system comprises a plurality of conveyors, each of the conveyors for transporting parts through an associated one of the processing areas. Each of the conveyors are driven by a motor. Each of a plurality of sensors are associated with one of the plurality of processing areas. Each of a plurality of control interfaces are associated with a device in one of the plurality of processing areas. Each of a plurality of control circuits are associated with one of the plurality of processing areas and coupled to corresponding sensors and corresponding interfaces. At least one operator interface is coupled to the plurality of control circuits. Wherein, the operator interface can modularly control and monitor devices within the plurality of processing areas.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

The powder coating conveyor modular line control system is intended especially for the high speed conveyorized transports systems used in blank powder coat finishing processes. However, the technique of the present invention is equally applicable to other conveyorized transport systems.

As discussed above, accurate control and monitoring of the high speed transport system used in blank powder coat finishing processes is critical for consistent substrate exposure time to pretreatment chemicals, cure time, and for uniform thickness of the thin film powder coating. Operators can continuously monitor all machine control functions and parameters for operation and maintenance of the high speed line. Rapid system diagnosis and maintenance including remote access capabilities are provided. Automated operator interfaces mimic the actual equipment layout and processes which provides for rapid access to the device functions by the operator simply understanding the relative location of a device and what it does. By selecting a particular process or device, interfaces providing greater detail are provided, which are analogous to the actual equipment functions. The interfaces utilize graphical representations including color coding and are supplemented with numerical data, thus minimizing the dependence on text and a particular language.

Figure 1:
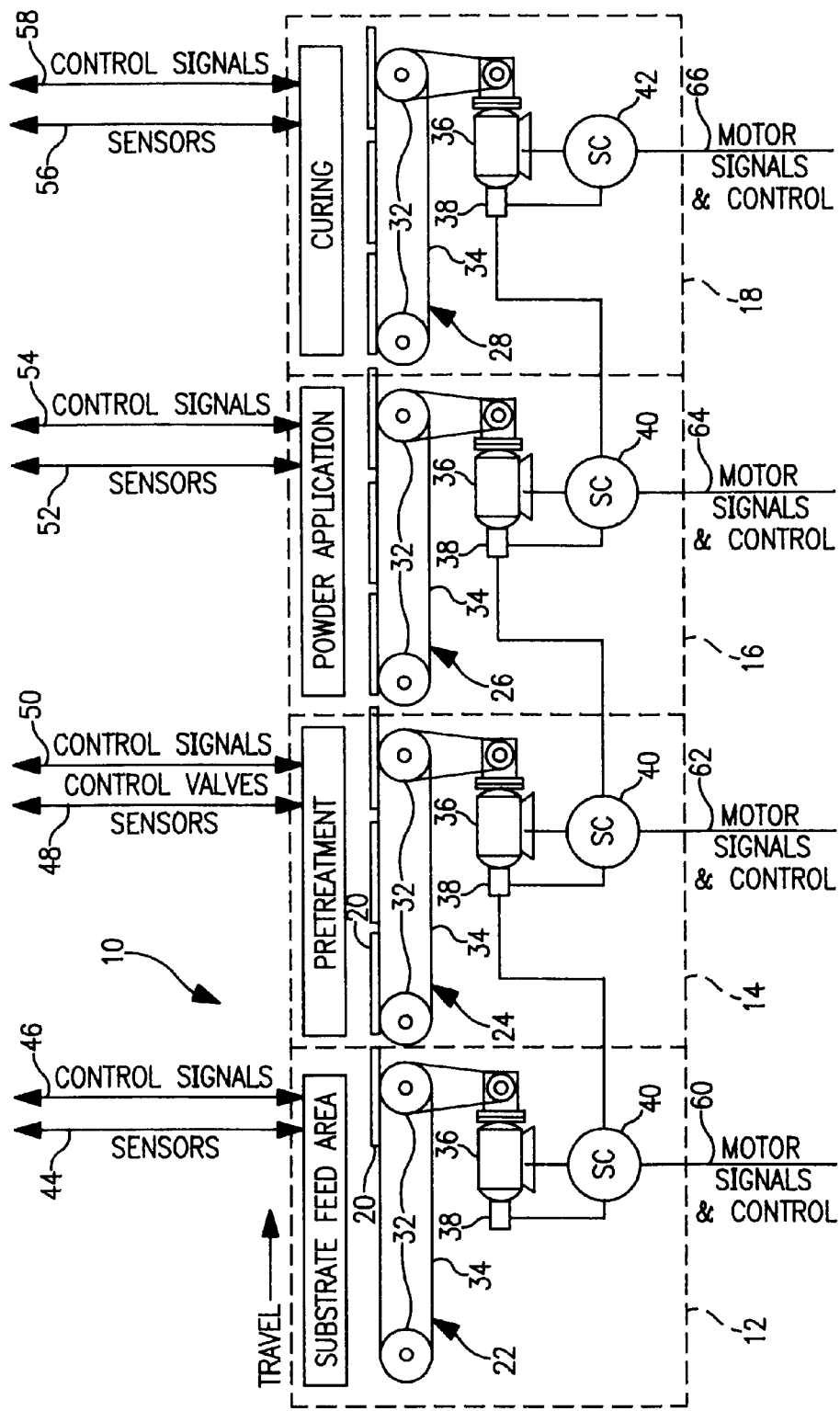
FIG. 1 is a schematic view of an exemplary embodiment of a blank powder coat finishing process implemented with an in line conveyorized transport system that employs the modular line control features of the present invention.

Referring now to FIG. 1, an exemplary embodiment of a blank powder coat finishing process is depicted. The blank powder coat finishing process is implemented with an in line conveyorized transport system 10 that employs the modular line control features of the present invention. The finishing process comprises a plurality of processing areas including a substrate in feed area 12, a substrate pretreatment processing area 14, a powder application processing area 16, and a powder curing processing area 18. Prior to finishing, sheets made from cold-rolled steel, zinc/aluminum-coated steel, zinc-coated galvanized steel and the like are stamped into a plurality pre-cut blanks 20. Each pre-cut blank or substrate 20 includes all the requisite cut-outs, holes, notches and the like, formed therein. The pre-cut substrates 20 are stored at the substrate in feed area 12. A pre-cut substrate 20 can be up to 16 feet long and 4 feet wide. The pre-cut substrates 20 are transported through the processing areas on the conveyorized transport system 10 which consists of an in feed conveyor 22, a pretreatment conveyor 24, a powder application conveyor 26 and a powder curing conveyor 28.

A conventional automated part feeder places the pre-cut substrates 20 onto the substrate feed conveyor 22 which continuously feeds the pre-cut substrates 20 into the system 10. Sensor signals 44 provide information on conditions within the substrate in feed area 12. Control signals 46 allow for the setting and manipulation of conditions within the substrate in feed area 12.

The substrates 20 first enter the substrate pretreatment processing area 14 which includes standard washing equipment for removing oil and residual dirt from each substrate and then sealing each substrate with a "dry-in-place" type of sealant, a chrome type of sealant or a non-chrome type of sealant. A conventional high velocity convection dry-off oven is used to dry each substrate and then high velocity refrigerated air is blown over the substrates to cool them below approximately 95° F. before they leave the substrate pretreatment processing area 14. Sensor signals 48 provide information on conditions within the substrate pretreatment processing area 14. Control signals 50 allow for the setting and manipulation of conditions within the substrate pretreatment processing area 14.

The pre-cut substrates 20 then enter the powder coating processing area 16 which has standard equipment for applying a uniform 1.4 to 1.6 mil layer of paint powder on the pre-cut substrates 20. The powder coating equipment allows for quick color changes. Color changes may be accomplished through a single powder coating processing area 16 or to simplify cleaning and allow for very rapid color changes, the powder coating processing area 16 can be modularized, allowing essentially selection of the particular color or material by selecting a particular module. Sensor signals 52 provide information on conditions within the powder coating processing area 16 including identification of the particular color module. Control signals 54 allow for the setting and manipulation of conditions within the powder coating processing area 16.

The powder coated pre-cut substrates 20 then enter the powder curing processing area 18. Since conveyor line speeds of up to 80 feet per minute are commonly employed in the blank powder coating finishing systems, infrared (IR) enhance convection heating equipment is used in the powder curing processing area 18. The IR heating equipment provides fast and carefully controlled temperature ramp-up which melts the powder layer applied to the substrates so that it begins to flow almost immediately. The IR enhanced convection heating equipment includes a pre-heat zone where high-purity electric IR emitters provide an isolated, non-contaminating environment with rapid temperature ramp-up of the powder coating and the substrate. A equalization zone combines IR and high-velocity indirect natural gas convection heat to produce temperatures of 500 to 650° F. A holding zone uses convection heating only that maintains all surfaces at a predetermined temperature based on specific cure requirements of the powder used. Sensor signals 56 provide information on conditions within the powder curing processing area 18. Control signals 58 allow for the setting and manipulation of conditions within the powder curing processing area 18.

Each conveyor 22, 24, 26, 28 includes a pair of rollers 32 coupled together by a looped conveyor belt 34. A motor 36 is coupled to one of the rollers 32 to drive the conveyor. The motor 36 includes a digital motor shaft encoder 38 attached thereto that monitors the rotational speed of the motor shaft (not visible). The substrate in feed conveyor 22, the substrate pretreatment conveyor 24, and the powder application conveyor 26, each have a slaved closed loop motor speed controller 40 that is wired to the conveyor's respective motor 36 and digital motor shaft encoder 38, to maintain accurate conveyor speed regulation. The powder curing conveyor 28 is provided with master closed loop speed controller 42 that is wired to its respective motor 36 and encoder 38. Access for the control and monitoring of the motors 36 are provided through the motor signals and control lines 60, 62, 64 and 66.

In operation, the automated part feeder places the pre-cut substrates 20 onto the in feed conveyor 22 at precise predetermined time intervals which produces a typical substrate spacing of 2 to 3 inches. Each newly placed substrate 20 travels along the in feed conveyor 22 and is sensed by the part detector sensor at the output of the in feed conveyor 22. As each substrate 20 passes the in feed conveyor part detector sensor, a position signal indicative of that substrate is generated by this sensor which is read by the computer 48.

Figure 2A:
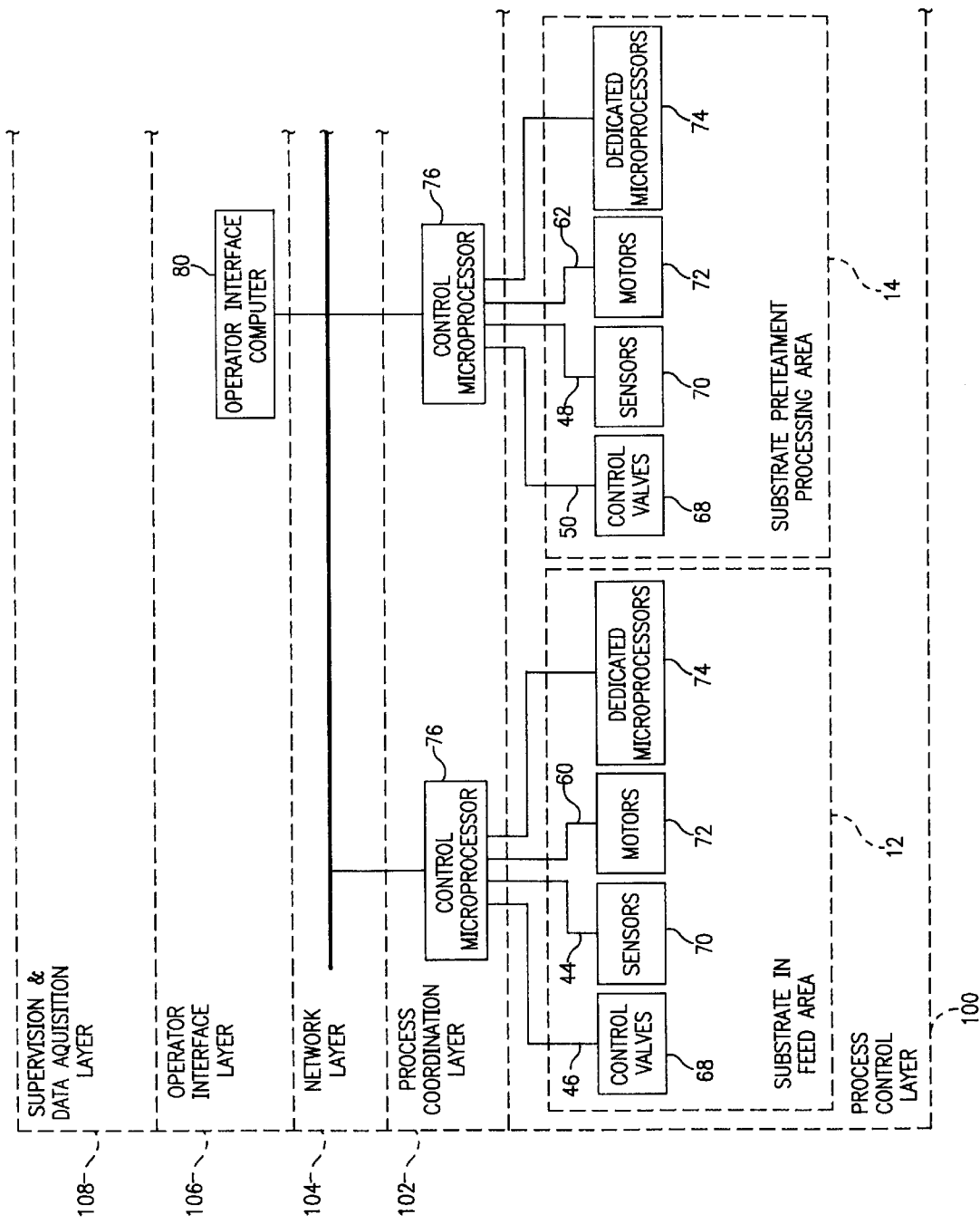
FIG. 2 is a block diagram of the modular line control system.
Figure 2B:
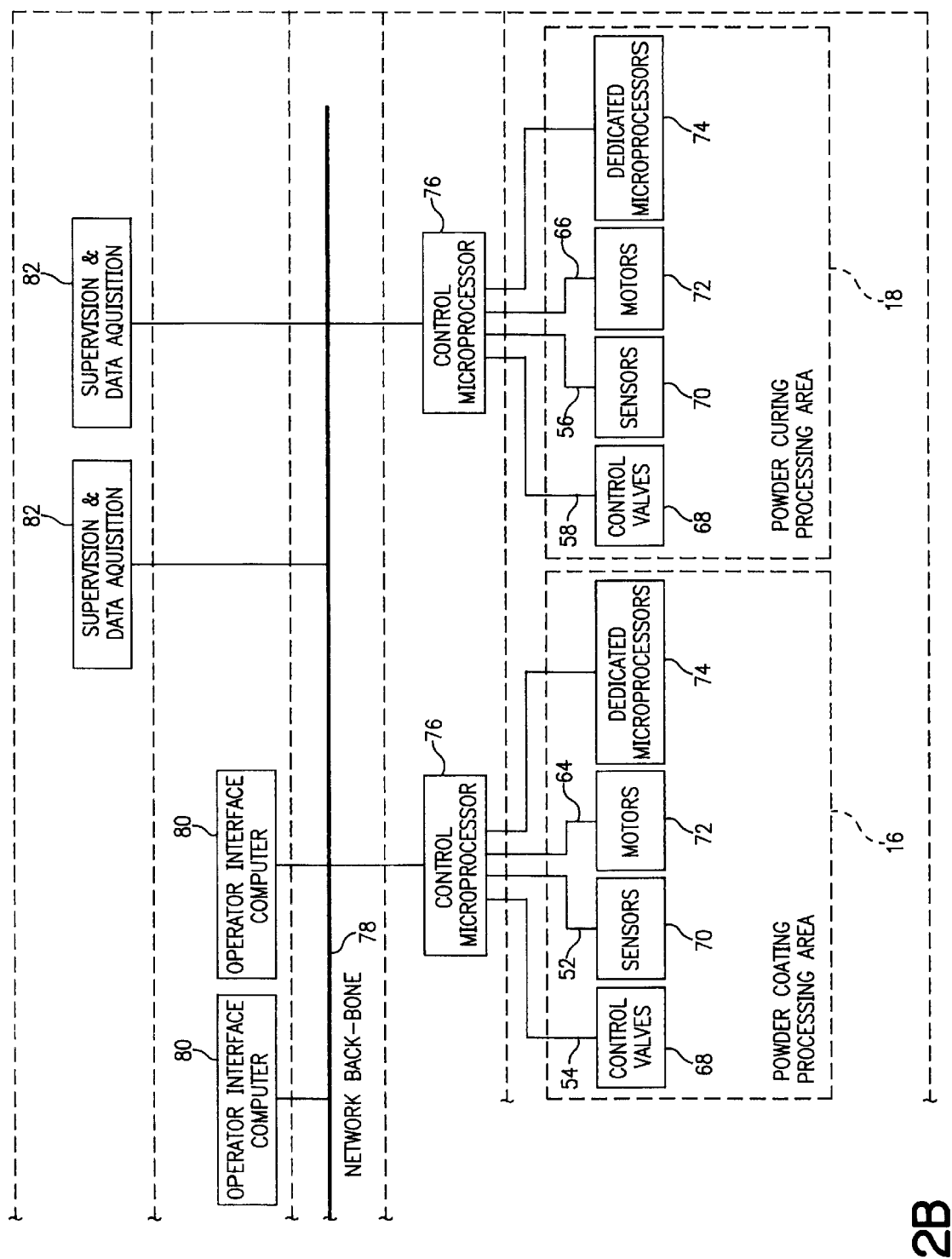

Referring to FIG. 2 there is shown a block diagram of the modular line control system. The conveyorized transport system has four stages which correspond to the stages shown in FIG. 1, the substrate in feed area 12, the substrate pretreatment processing area 14, the powder coating processing area 16, and the powder curing processing area 18. Each of the four stages contain control valves 68 for controlling electrical, fluid, and mechanical processes. The control valves 68 are accessed through corresponding control signals 46, 50, 54 and 58. Additionally each of the four stages contain sensors 70 for monitoring temperature, flow rates, motion, fluid levels and other conditions. The sensors 70 are accessed through corresponding sensor lines 44, 48, 52 and 56. A motor system 72 comprising a motor, speed controller and digital shaft encoder is contained in each of the four stages and is accessed through the corresponding motor signals and control line 60, 62, 64 and 66. Dedicated microprocessors 74 are used to maintain chemical concentrations, speed, temperature and other factors within the corresponding stage. Together these elements form a process control layer 100 which makes up the individual control devices which directly control a particular stage.

A process coordination layer 102 contains control microprocessors 76 which interface to the corresponding stage in the processor control layer 100. Each of the control microprocessors 76 is coupled to a network back-bone 78. The process coordination layer 102 coordinates control between the control microprocessors 76 through the network back-bone 78. The control microprocessors 76 provide manual control for trouble shooting, manages various process devices, and fills line data requests for the corresponding stage.

An operator interface layer 106 contains at least one operator interface computer 80 and is coupled to the network back-bone 78. The operator interface computer 80 provides for control of the process control layer 100 for maintenance operations, adjusting process setpoints, etc. Monitoring of the process control layer 100 and process coordination layer 102 are provided by the operator interface computer 80 including viewing 'real time' process values for diagnostics, compiling production reports and product labeling. Remote access for off site diagnostics and monitoring is available through a suitable communication interface (not shown).

A supervision and data acquisition layer 108 contains at least one supervision and data acquisition computer 82 for retrieving production line data for production reports, compiling graphical information, determining raw materials usage, and coordinating sales orders with production run quantities and scheduling.

A network layer 104 provides a peer to peer interface for the supervision and data acquisition computers 82, the operator interface computers 80, and the control microprocessors 76 through the network back-bone 78 via data packets. This architecture does not require a file server, rather it utilizes a communication technique to issue data transfers and requests. A particular computer system, such as the supervision and data acquisition computers 82, the operator interface computers 80, and the control microprocessors 76, must initiate a request for data from another computer system attached to the network back-bone 78 and is responsible for enunciating failure of a data request to be filled.

The control microprocessors 76 in the process coordination layer 102 store the necessary data that can be requested through the network in a contiguous address. This 'packed' data scheme significantly reduces overhead resulting in very fast transfer of data packets. By keeping network traffic to a low level through packing data and requesting data, near 'real time' updates to data are provided to the operator interface computers 80 and the supervision and data acquisition computers 82.

Figures 3A, 3B, 3C:
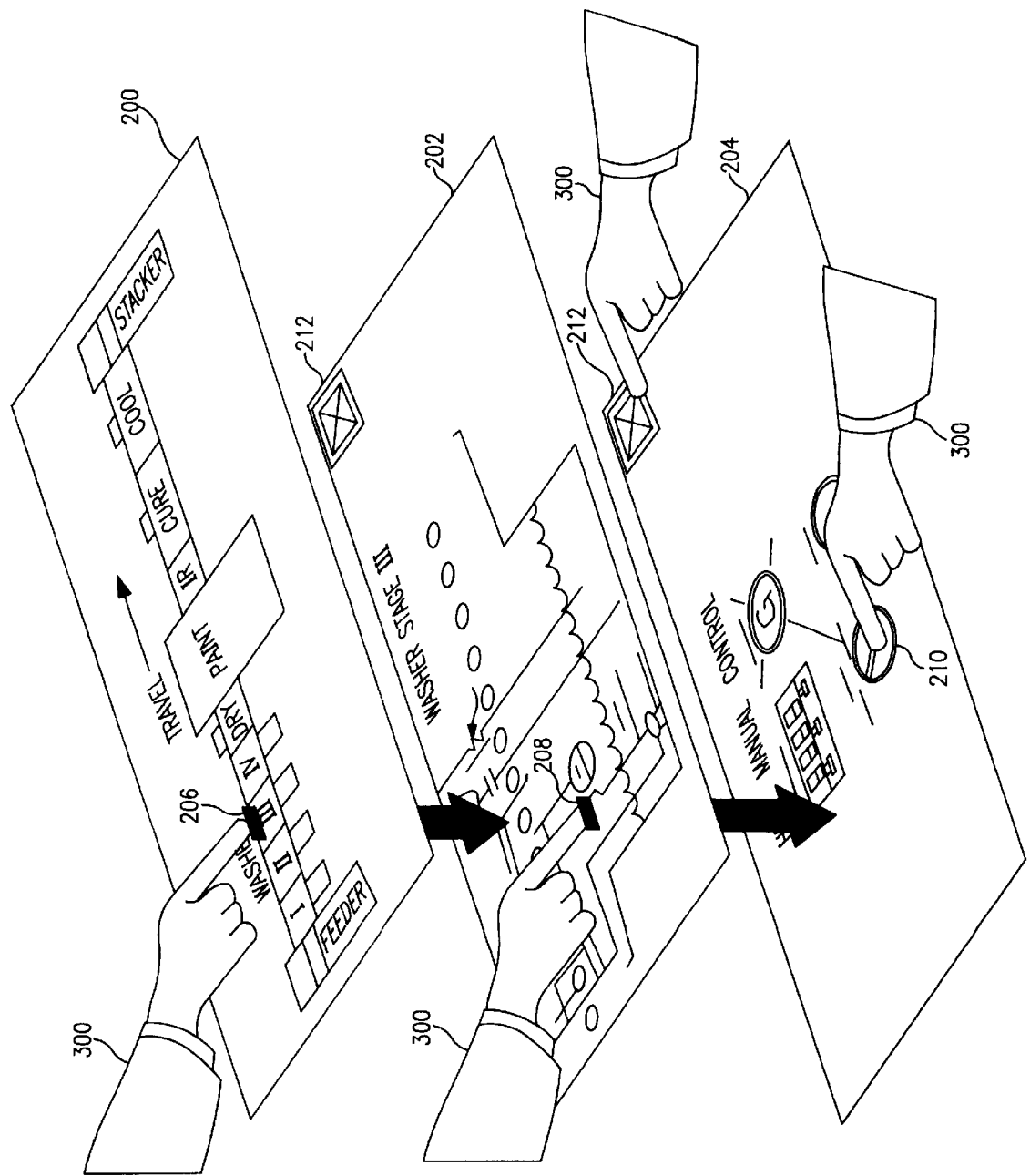
FIGS. 3a, 3b and 3c are pictorial representations of a typical sequence of user interfaces.

Referring to FIGS. 3a, 3b and 3c there are shown pictorial representations of a typical sequence of user interfaces. In this exemplary embodiment there is shown a three level menu system having a main graphical menu 200, a detailed device menu 202 and an options menu 204. The main graphical menu 200 depicts a floor plan of a powder coating process line. This is the high level menu that is displayed to an operator. The operator 300 selects a particular portion of the coating process line from the main graphical menu 200. In this example the operator 300 selected by touching a washer stage 206 in the main graphical menu 200. The detailed device menu 202 corresponding to the washer stage 206 replaces the main graphical menu 200. Selecting a particular device 208 on the detailed device menu 202 results in a corresponding options menu 204 replacing the detailed device menu 202. The graphical objects contained on the options menu 204 resemble standard industrial operators which are familiar to operators and maintenance personnel. Individual devices can be set, monitored, reset, and manually overriden by the operator by selection an appropriate option response 210. By selection an exit object 212 the prior menu is returned to.

Each of the menus employ a simple universal color code scheme to indicate the status of the various powder coating process line sections or devices. This provides a graphical interface which does not rely on text or messages to describe a particular stage or device status or failure. A blinking red section or device indicates a failure or that immediate attention is required. A blinking yellow section or device indicates a potential problem or that attention will be required in the near future. A green section or device indicates that it is running or is on. A gray, black or white section or device indicates that it is not running or is off.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A conveyor system for transporting parts through a plurality of processing areas, comprising:

a plurality of conveyors, each of said conveyors associated with one of said plurality of processing areas for transporting parts therethrough, each of said conveyors being driven by a motor;

a plurality of sensors, each of said sensors associated with one of said plurality of processing areas;

a plurality of control circuits, each of said control circuits associated with one of said plurality of processing areas;

a plurality of control digital processors, each associated with one of the plurality of processing areas and coupled to corresponding motors, sensors and control circuits for controlling the motors and control circuits;

at least one operator interface; and said control digital processors and operator interface being connected in a communication network.

2. The conveyor system as recited in claim 1, further comprising a part detector associated with each conveyor, for verifying each part's progress along that conveyor.

3. The conveyor system as recited in claim 1 wherein said control circuits associated with one of said plurality of processing areas store data of said corresponding sensors in a contiguous location of memory.

4. The conveyor system as recited in claim 1 wherein said control circuits associated with one of said plurality of processing areas store data in a contiguous location of memory.

5. The conveyor system as recited in claim 3 wherein said operator interface accesses said contiguous location of memory.

6. The conveyor system as recited in claim 1 wherein said operator interface provides a graphical indication of said devices within said plurality of processing areas.

7. The conveyor system as recited in claim 6 wherein said graphical indication provides a color coded indication of status of said devices within said plurality of processing areas.

8. The conveyor system as recited in claim 1, further comprising a remote operator interface.

9. The conveyor system as recited in claim 1, wherein said conveyors are arranged in an in line manner.

10. A conveyor system for transporting pre-cut substrates through a blank powder coat finishing process having processing areas including a pretreatment processing area, a powder application processing area, and a powder curing processing area, said conveyor system comprising:

a plurality of conveyors, each of said conveyors associated with one of said processing areas for transporting pre-cut substrates therethrough, each of said conveyors being driven by a motor;

a plurality of sensors, each of said sensors associated with one of said processing areas;

a plurality of control circuits, each of said control circuits associated with one of said processing areas;

a plurality of control digital processors, each associated with one of the plurality of processing areas and coupled to corresponding motors, sensors and control circuits for controlling the motors and control circuits;

at least one operator interface; and said control digital processors and operator interface being connected in a communication network.

11. The conveyor system as recited in claim 10, further comprising a part detector associated with each conveyor, for verifying each pre-cut substrate's progress along that conveyor.

12. The conveyor system as recited in claim 10 wherein said control circuits associated with one of said processing areas store data of said corresponding sensors in a contiguous location of memory.

13. The conveyor system as recited in claim 10 wherein said control circuits associated with one of said processing areas store data in a contiguous location of memory.

14. The conveyor system as recited in claim 12 wherein said operator interface accesses said contiguous location of memory.

15. The conveyor system as recited in claim 10 wherein said operator interface provides a graphical indication of said devices within said plurality of processing areas.

16. The conveyor system as recited in claim 15 wherein said graphical indication provides a color coded indication of status of said devices within said plurality of processing areas.

17. The conveyor system as recited in claim 10, further comprising a remote operator interface.

18. The conveyor system as recited in claim 10, wherein said conveyors are arranged in an in line manner.

19. The conveyor system as recited in claim 10, wherein said powder application processing area is associated with a modular powder application section wherein a powder to be applied to said pre-cut substrates can be changed by changing said modular powder application section.

20. The conveyor system as recited in claim 19 wherein said at least one operator interface identifies said modular powder application section and said powder to be applied.

* * * * *